(No Model.)

W. E. NICKERSON.
FLUID SPEED REGULATOR FOR ELEVATORS.

No. 396,889. Patented Jan. 29, 1889.

WITNESSES.
Frank C. Parker.
Matthew M. Blunt.

INVENTOR.
William E. Nickerson

UNITED STATES PATENT OFFICE.

WILLIAM E. NICKERSON, OF CAMBRIDGE, MASSACHUSETTS.

FLUID SPEED-REGULATOR FOR ELEVATORS.

SPECIFICATION forming part of Letters Patent No. 396,889, dated January 29, 1889.

Application filed September 27, 1888. Serial No. 236,621. (No model.)

*To all whom it may concern:*

Be it known that I, WILLIAM E. NICKERSON, of Cambridge, in the county of Middlesex and State of Massachusetts, have invented a new and useful Improvement in Fluid Speed-Regulators for Elevators, &c., of which the following, taken in connection with the accompanying drawings, is a specification.

The object of my invention is to adapt a double-acting valve to prevent the flow of a current of fluid from one side of a piston of a speed-regulator to the other whenever the velocity of said current, as engendered by the speed of the piston, is such as would arise from a dangerous rate of speed of the mechanism the velocity of which it is desirable to regulate. This object I attain by the mechanism shown in the accompanying drawings, in which—

Figure 1:
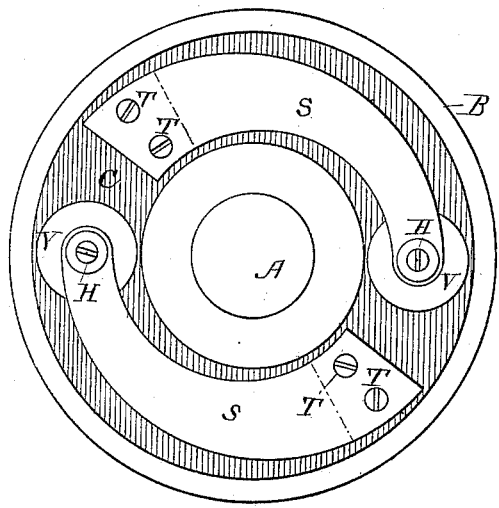
Figure 3:
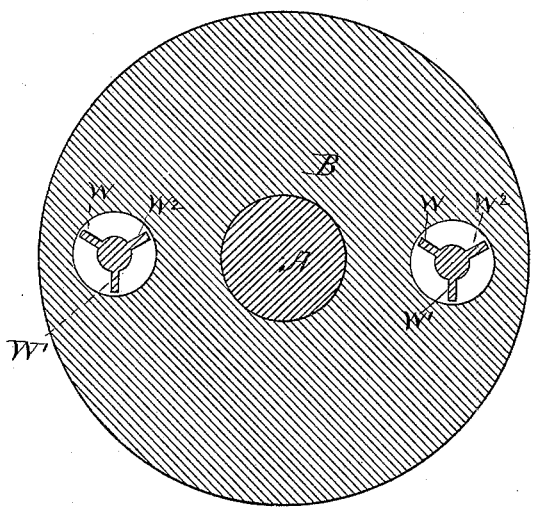
Figure 2:
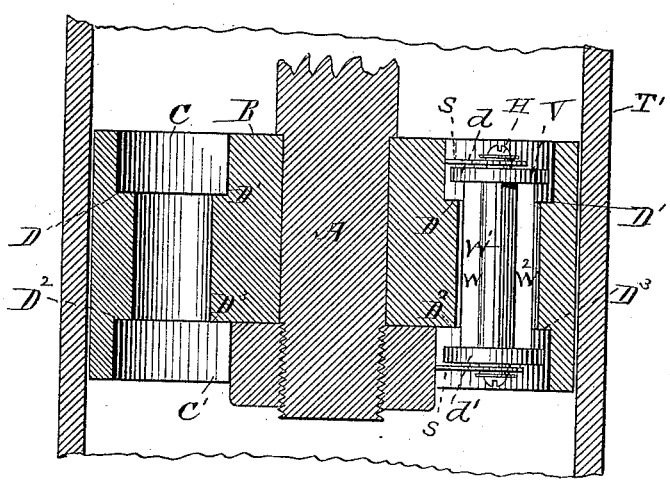

Figure 1 is a plan showing one side of a piston with my valve device attached. Fig. 2 is a vertical section showing the position and shape of the valve-openings and the valves. Fig. 3 is a horizontal section taken on line $x\ x$ of Fig. 2.

To illustrate my invention I have chosen the device as applied to a piston, although the double-acting valve would work with equal efficiency in a passage in or about the walls of the cylinder, the sole object of the valve and its connected parts being to regulate the speed of the mechanism to which it is applied by checking the flow of a fluid the current in which is engendered by the moving piston.

In the drawings, A represents a piston-rod, to which the piston B is secured. Within this piston B, I form recesses, one on each side of the piston, as indicated by C C', Figs. 1 and 2. Between the recesses I have valve-openings D D' $D^2$ $D^3$, for the purpose of receiving the valves V V.

The valves V V are made with two disks, $d\ d$, which have between them a winged connecting-bar, said bar having three wings, W W' $W^2$. (See Figs. 1, 2, and 3.) These valves are double-acting—that is, each has two valve-disks, one at each end, as indicated by $d\ d'$— and have two seats, one at D D' and one at $D^2$ $D^3$, Fig. 2, and the connecting-bar is so formed that its wings W W' $W^2$ form guides for keeping the valve-disks $d$ and $d'$ in their normal axial position, their normal longitudinal position being determined by springs S S, Figs. 1 and 2.

The springs S are made, preferably, of flat plates of metal and are made fast to the piston B by screws T T, Fig. 1, the free ends of the springs being attached to the valves by screws and washers, as indicated by H, Fig. 2. As each valve has two springs, one at each end, and of about equal tension, it is obvious that the valve when not acted upon by extraneous force will stand as indicated by the drawings, Fig. 2—that is so that fluid may pass through in either direction; but if a rapid current is generated, as would occur when the piston is being driven rapidly, then the pressure generated by the high velocity of the piston would cause the valve to move in the direction of the current and close the passage in the piston, and thus prevent it from moving so rapidly—in other words, regulate its velocity of motion and, acting through its connection devices, would in a like degree check the velocity of the attached mechanism.

It is obvious that instead of a valve made with two working ends, as I have described, two valves may be used, or a single valve having two seats.

A part only of the cylinder T' is shown in Fig. 2, as it is not deemed necessary to show the entire cylinder.

I claim—

In a fluid speed-regulator device, the combination of the cylinder T, piston-rod A, and piston B, with a two-seated valve, V, and springs S S, adapted to hold the valve open and to yield sufficiently to allow the valve to close when the velocity of the fluid in its valve-passage in either direction generates a certain amount of pressure.

WILLIAM E. NICKERSON.

Witnesses:
FRANK G. PARKER,
MATTHEW M. BLUNT.